United States Patent [19]

Matsuo et al.

[11] 4,028,316

[45] June 7, 1977

[54] VULCANIZED ACRYLATE-ETHYLIDENE NORBORNENE POLYMERS

[75] Inventors: Tadao Matsuo; Minoru Miura; Satoshi Mashimo, all of Kobe; Masanori Kakei, Toyonaka; Kyoichi Mishima, Nishinomiya, all of Japan

[73] Assignee: Mitsubishi Belting Limited, Kobe, Japan

[22] Filed: Feb. 17, 1976

[21] Appl. No.: 658,936

Related U.S. Application Data

[63] Continuation of Ser. No. 485,660, July 3, 1974, abandoned.

[30] Foreign Application Priority Data

July 5, 1973 Japan ............................... 48-76206
Apr. 29, 1974 Japan ............................... 49-48096

[52] U.S. Cl. ...................... 260/79.5 P; 260/23 AR; 260/63 BB; 260/79.5 C; 526/217; 526/282
[51] Int. Cl.$^2$ ........................................... C08F 8/34
[58] Field of Search ................ 260/79.5 C, 79.5 P; 526/282

[56] References Cited

UNITED STATES PATENTS

| | | | |
|---|---|---|---|
| 3,402,158 | 9/1968 | Santaniello et al. | 260/80.81 |
| 3,487,054 | 12/1969 | Minnerly et al. | 260/79.5 |
| 3,554,886 | 1/1971 | Colomb et al. | 204/159.12 |
| 3,814,734 | 6/1974 | Kawasumi et al. | 260/63 R |

Primary Examiner—Stanford M. Levin
Attorney, Agent, or Firm—Sughrue, Rothwell, Mion, Zinn & Macpeak

[57] ABSTRACT

An acrylic copolymer composition capable of being vulcanized with sulfur comprising the radical polymerization product of (1) a monomer mixture comprising an acrylic acid ester and ethylidene norbornene, (2) a monomer mixture comprising an acrylic acid ester, ethylidene norbornene and acrylonitrile, (3) a monomer mixture comprising an acrylic acid ester and vinyl norbornene, or (4) a monomer mixture comprising an acrylic acid ester, vinyl norbornene and at least one unsaturated compound selected from the group consisting of monovinyl compounds, monovinylidene compounds and monovinylene compounds.

12 Claims, 2 Drawing Figures

VULCANIZED ACRYLATE-ETHYLIDENE NORBORNENE POLYMERS

This is a continuation of application Ser. No. 485,660, filed July 3, 1974, now abandoned.

BACKGROUND OF THE INVENTION

1. Field of the Invention

The present invention relates to an acrylic copolymer composition (hereinafter, designated as an acrylic rubber) which is capable of being vulcanized with sulfur and has excellent processing properties, good water resistance, good heat resistance, and good oil resistance. In greater detail, it relates to acrylic rubbers capable of being vulcanized with sulfur which are produced by radical polymerization of (1) a monomer mixture comprising an acrylic acid ester derivative or a mixture thereof and ethylidene norbornene, (2) a monomer mixture comprising the above described mixture (1) and acrylonitrile, (3) a monomer mixture comprising an acrylic acid ester and vinyl norbornene, or (4) a monomer mixture comprising the above described mixture (3) and at least one selected from monovinyl unsaturated compounds and monovinylene unsaturated compounds.

2. Description of the Prior Art

In general, acrylic rubbers have excellent properties such as heat resistance, oil resistance, weather-proofing properties, ozone resistance and gas-impermeability. Particularly, where heat resistance and oil resistance are required, acrylic rubbers are utilized in place of nitrile rubber from which sufficient results could not be obtained. At present, as acrylic rubbers which have been practically used, those composed of an acrylic acid ester derivative such as ethyl acrylate or butyl acrylate or a mixture thereof as a main constituent and produced if desired, by copolymerizing with acrylonitrile, styrene or methyl methacrylate have been widely used. Furthermore, to facilitate vulcanizing, chlorine type rubbers produced by copolymerizing the above described monomers with 2-chloroethyl vinyl ether or vinyl chloroacetate and epoxy type rubbers produced by copolymerizing the above described monomers with allyl glycidyl ether or glycidyl methacrylate, etc. have been used. However, chlorine type rubbers and epoxy type rubbers have the fault that vulcanizates with good properties can not be obtained if they are not subjected to post-vulcanization for 5 to 24 hours at 150° to 200° C after vulcanization in a mold.

Further, since acrylic rubbers produced by copolymerizing these chlorine type and epoxy type materials can not be vulcanized with sulfur and/or a sulfur donor accelerator alone, a combination of triethylenetetramine with dibenzothiazyl disulfide and a combination of sulfur and a trimene base (a reaction product of ethyl chloride, formaldehyde and ammonia) are usually used. In some other cases ammonium salts of organic carboxylic acids, dithiocarbamates or thiourea derivatives, etc. are used as vulcanizing agents. However, when amines are used as the vulcanizing agent, the level of sanitary conditions of the work room decreases and the resulting acrylic rubber goods can not be used in the medical and food industries. In other words, amine vapor generated gives rise to bad influence on workers' bodies, and also when the resulting acrylic rubber containing unreacted amine is used as a conveyor belt for transportation of foodstuffs, the amine remaining unreacted generates amine vapor resulting in the contamination of foodstuffs. In addition, there is the disadvantage that satisfactory properties often can not be obtained if the rubber is not subjected to post-vulcanization for 5 to 24 hours at about 170° C after vulcanization at the above described temperature for 5 to 40 minutes. Furthermore, amines cause corrosion of an iron mold or of cords of steel wires buried as a tension member in a rubber-timing belt to shorten the life thereof. In vulcanization of acrylic rubbers using a known soap (sodium stearate or potassium stearate)-sulfur although the above described disadvantages caused by vulcanizing using amines can be avoided, vulcanizates having satisfactory properties can not be obtained if the vulcanization thereof is not carried out at a temperature as high as 170° to 190° C which is higher than the vulcanization temperature range of 130° to 160° C of diene rubbers such as natural rubber or SBR (styrene-butadiene rubber), etc. using sulfur. Such a high temperature is difficult to obtain using the conventional press-vulcanization with steam, and consequently, they have the same disadvantage in that post-vulcanization is necessary in the above described chlorine type and epoxy type acrylic rubbers.

As the result of research on improving these disadvantages it has been found that the vulcanizing using sulfur can be carried out by bonding the main chains of acrylic rubbers with saturated hydrocarbons and introducing double bonds into the side chains of acrylic rubbers. Thus, the synthesis of acrylic rubbers having the many characteristics of vulcanizates with sulfur without loss of heat resistance and oil resistance of the acrylic rubbers has been accomplished. Namely, in the rubber rheometer cure curve, there is a range in which the curve rises rapidly with a sharp gradient after a suitable induction time and then a flat plateau range (plateau effect). Thus the processing ability and quality uniformity can be improved and the post-vulcanization required in the prior chlorine type or epoxy type vulcanization system need not be carried out. Further, the heat resistance and the oil resistance of such sulfur-vulcanized rubbers can be easily improved by blending with such rubber. Moreover, in producing a co-vulcanized product by combining different rubbers and vulcanizing by heating under pressure, which is often used industrially, it is necessary to make the vulcanization rates of both rubbers equal. Accordingly, if both rubbers belong to the same or an analogous vulcanization system, the vulcanization rates can be easily adjusted so as to be equal to each other, and, of course, additional high adhesive strength can be easily obtained. Accordingly, development of acrylic rubbers which can be vulcanized using sulfur is industrially important.

As acrylic rubbers already developed for improving the above described disadvantages, those acrylic rubbers produced by copolymerizing an acrylic acid ester with tetrahydrobenzyl acrylate (U.S. Pat. No. 3,497,571), an acrylate of hydroxydicyclopentadiene (Japanese Pat. Publication No. 7893/1972), dicyclopentadiene (British Pat. No. 1,062,969 and U.S. Pat. No. 3,402,158) or methyl cyclopentadiene (U.S. Pat. No. 3,487,054), etc. as a third component are known. However, in these cases, since the ester residues which make sulfur vulcanizing possible are combined with a polymer main chain of the polymer by an ester group, these rubbers have the disadvantages that they are hydrolyzed, other faults are that they are vulcanized at a very slow rate or that they adhere to rolls during rolling operations. In order to eliminate such faults, copolymerization with a small amount of a difunctional diene compound is necessary, and consequently, satisfactory products have not been obtained until now.

SUMMARY OF THE INVENTION

As a result of much research for removing these disadvantages the present invention has been accomplished and it has been found that acrylic rubbers having the desired characteristics can be obtained by using as a raw material a copolymer produced by adding a suitable amount of a radical polymerization initiator to a monomer mixture comprising 1. a mixture of
A. 85 to 99 parts by weight of an acrylic acid ester derivative of an aliphatic alcohol having 1 to 8 carbon atoms or a mixture thereof, and
B. 1 to 15 parts by weight of ethylidene norbornene;
2. a mixture of
A. 55 to about 99 parts by weight of an acrylic acid ester derivative of an aliphatic alcohol having 1 to 8 carbon atoms or a mixture thereof,
B. 1 to 15 parts by weight of ethylidene norbornene, and
C. up to about 30 parts by weight of acrylonitrile;
3. a mixture of
A'. 85 to 98 parts by weight of an acrylic acid ester derivative of an aliphatic alcohol having 1 to 8 carbon atoms or a mixture thereof, and
B'. 2 to 15 parts by weight of vinyl norbornene
4. a mixture of
A'. 55 to about 98 parts by weight of an acrylic acid ester derivative of an aliphatic alcohol having 1 to 8 carbon atoms or a mixture thereof,
B'. 2 to 15 parts by weight of vinyl norbornene, and
C'. up to about 30 parts by weight of at least one monomer selected from the group consisting of monovinyl unsaturated compounds, vinylidene unsaturated compound and monovinylene unsaturated compounds other than the above described compounds, adding a vulcanizing agent and compounding ingredients for rubber to the copolymers and vulcanizing the mixture.

DETAILED DESCRIPTION OF THE INVENTION

Figure 1:
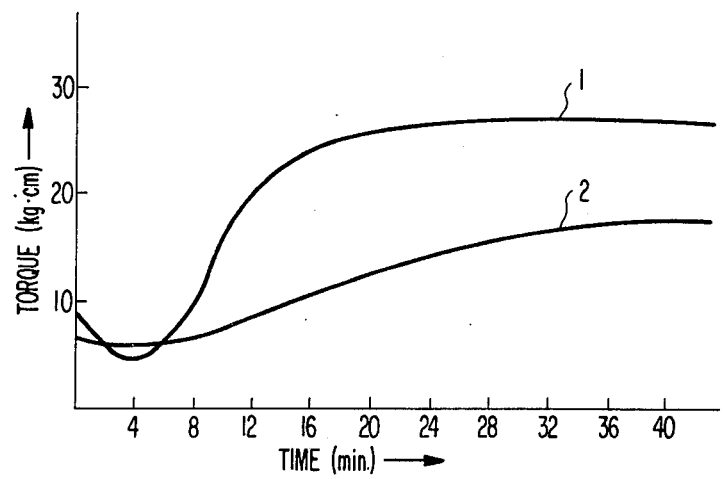
FIGS. 1 and 2 show polymer rheometer cure curves.

Examples of the acrylic acid esters of (A) and (A') used for copolymerization include esters of acrylic acid with lower aliphatic alcohol having 1 to 8 carbon atoms, both straight and branched chain, e.g. methyl acrylate, ethyl acrylate, propyl acrylate, n-butyl acrylate, i-butyl acrylate, pentyl acrylate, hexyl acrylate, 2-ethylhexyl acrylate and octyl acrylate, etc. These acrylic acid esters can be used alone or as a mixture of two or more thereof. Ethyl acrylate, butyl acrylate and mixtures thereof are preferred. In these acrylic acid esters, the glass transition temperature decreases and impact resilience increases as the chain length of the ester residue increases and the number of side chains increases. However, the tensile strength, the heat resistance and the oil resistance thereof are reduced inversely in proportion to the chain length of the ester residue. Therefore, an appropriate choice of acrylic acid ester is needed in order to meet the requirement for the vulcanized rubber therefrom. The vulcanizing of the rubbers of the present invention with sulfur can be carried out with a mixture of only (A) and (B). However, in order to compensate for the above described defects and to further improve the properties, acrylonitrile as Component (C) is added thereto in an amount in proportion to the chain length of the ester residue and quantity thereof. It is also preferred that the acrylonitrile be used in a larger amount as branched chains in the ester residue increases, a suitable amount ranges up to about 30 parts by weight, e.g., about 0.001 part by weight up to about 30 parts by weight.

The acrylic acid ester derivative or a mixture thereof is suitably used in the amount of about 55 to 99 parts by weight. If the amount is below about 55 parts by weight, the resulting copolymers become brittle, while if the amount is above 99 parts by weight, the vulcanization rate decreases.

In the present invention, the most preferred processings and the most suitable vulcanization rate can be obtained when ethylidene norbornene as Component (B) is used in a amount of 4 to 8 parts by weight. If the ethylidene norbornene is used in the amount below about 1 part by weight, a long period of time is required for vulcanizaton of the copolymers and the processing ability thereof become very poor because the rubber sticks to rolls during rolling operations. If the amount is above about 15 parts by weight, the rubbers become hard and the addition of reinforcing agents, such as carbon black, etc. becomes difficult.

The above described ethylidene norbornene has been used already as a component of EPDM (ethylene-propylene-diene monomer) rubbers. However, anionic polymerization process has been employed. The reaction mechanism of ethylidene norbornene on radical polymerization is not at present completely clear.

According to the present invention, it is possible to provide acrylic rubbers which can be vulcanized using sulfur and have a good processability during rolling operations by copolymerizing acrylic acid esters with ethylidene norbornene or vinyl norbornene using a radical polymerization process.

In the present invention, a copolymer having the most preferred processing properties and the most suitable vulcanization rate can be obtained when vinyl norbornene as Component (B') is used in an amount of 4 to 10 parts by weight. If the amount of vinyl norbornene is below about 2 parts by weight, the vulcanization rate is low and the processing property become very poor because the rubber sticks to the rolls during the rolling operation. If the amount is above about 15 parts by weight, the gel content of the copolymer increases and the addition of fillers and reinforcing agents such as carbon black, etc. becomes difficult. Further, since the viscosity of the copolymer increases, flowing of the copolymer in the mold is poor.

Suitable monovinyl-, monovinylidene- and monovinylene unsaturated compounds which can be used for copolymerization as Component (C') are, for example, styrene, methyl methacrylate, acrylonitrile, α-methylstyrene, nitrostyrene, vinyl chloride, vinylidene chloride, vinyl acetate, alkyl vinyl esters, alkyl vinyl ketones, acrylic acid, methacrylic acid, octyl methacrylate, methyl ethacrylate, octyl acrylate, alkyl fumarates, chloroethyl acrylate, ethyl methacrylate, halogenated styrene such as chlorostyrene, vinyltoluene, methacrylonitrile, acrylamide, methacrylamide and N-methylol acrylamide, etc. Vulcanizing using sulfur of rubber composition (3) of the present invention can be carried out using a mixture of only (A') and (B'). However, in order to improve further the properties of the rubber, Component (C') of composition (4) can be used in the present invention. These compounds can be used alone or as a mixture of two or more thereof. These compounds have characteristics such as a hydrophilic properties, crystallizing properties and a high aggregation energy, etc. and are used for improving hydrolysis resistance, electrical properties, oil resistance and heat resistance, etc. They are used in an amount of at most about 30 parts by weight. If they are used in an amount of above about 30 parts by weight, the resulting copolymer becomes brittle and the impact resilience thereof is reduced. A suitable amount of the materials ranges up to about 30 parts by weight, e.g., about 0.001 part by weight up to about 30 parts by weight.

The acrylic copolymer compositions of the present invention can be easily produced by copolymerizing an unsaturated monomer mixture of the above described compositions (1) to (4) using a conventional radical polymerization process. Namely, an emulsion polymerization process, for example, as disclosed in U.S. Pat. No. 3,487,054, a suspension polymerization process, for example, as disclosed in U.S. Pat. No. 3,402,158 and a solution polymerization process, etc., can be used for polymerization. Furthermore, reinforcing agents, fillers, curing agents, accelerators and other chemicals can be added to the resulting copolymer using conventional methods, by which rubbers having good properties can be produced by vulcanizing at the same temperature under the same pressure as those employed with known diene rubbers or EPDM rubbers which do not require post-cure.

More specifically, the acrylic copolymers of this invention can be compounded so that they may be vulcanized by heating with the usual compounding ingredients to produce vulcanizates. The vulcanizing or curing agents are free sulfur preferably and/or sulfur releasing compounds. Accelerators can also be employed which can be any of those known to the art, for example, tetramethylthiuram disulfide, selinium diethyldithiocarbonate, 2-mereaptobenzothiazole, benzothiazyldisulfide, and the like. Other compounding ingredients are zinc oxide and other metal oxides conventionally used. If desired small amounts of fatty acids such as stearic acid can be included. Ageing resistors and anti-oxidants well known in the art such as octylated diphenylamines, styrenated phenols, polyalkyl polyphenols, PBNA, and others may be used. For special uses plasticizers, softeners, and tackifiers, and reinforcing pigments, for example, the various carbon blacks, both channel and furnace, inert fillers and diluents, can be used as will be understood by those skilled in the compounding art, if desired.

In the following, the present invention is illustrated in greater detail by reference to some examples, wherein all parts, percents, ratios and the like are by weight, unless otherwise indicated.

EXAMPLE 1

The following composition was polymerized using a suspension polymerization process.

|  | Parts |
|---|---|
| Ethyl acrylate | 100 |
| Ethylidene norbornene | 5.3 |
| N,N-Dimethylaniline | 1.0 |
| Distilled water | 400 |
| Polyvinyl alcohol | 0.1 |
| Sodium laurylbenzene sulfonate | 0.003 |
| Benzoyl peroxide | 1.5 |
| Benzene | 15 |

As a radical initiator, the above described benzoyl peroxide-N,N-dimethylaniline as a redox system was used. Benzoyl peroxide dissolved in benzene was added slowly to the mixture of raw materials in a reactor over a period of about 30 minutes to carry out the polymerization at 3°–5° C. After 2 to 2.5 hours from the beginning of addition, generation of heat by the reaction became maximum. Then stirring was continued for an additional 4 hours to end the polymerization reaction. The resulting polymer was light brown particles having a diameter of 0.2 to 1 mm, and the yield was 92 to 96%. The polymer was then washed with water and dried at 55° C under reduced pressure. Then the composition shown in Table 1 was prepared using the above described polymer, and the composition was vulcanized.

Table 1

|  | Parts |
|---|---|
| Polymer | 100 |
| HAF Carbon black | 40 |
| Zinc Oxide | 5 |
| Stearic acid | 1 |
| Dibenzothiazyl disulfide | 0.5 |
| Cadmium diethyldithiocarbamate | 3.8 |
| Sulfur | 0.5 |

The vulcanization was carried out for 20 minutes at 150° C. The resulting vulcanizates had the physical properties shown in Table 2.

Table 2

| | |
|---|---|
| Hardness (JIS) (°) | 76 |
| 300% Modulus (kg/cm$^2$) | 95 |
| Tensile strength (kg/cm$^2$) | 110 |
| Elongation (%) | 400 |

In order to compare many kinds of vulcanized rubbers, the compositions shown in the upper portion of Table 3 were polymerized using a suspension polymerization process and the resulting polymers were vulcanized as vulcanization compositions shown in the middle portion of Table 3. The vulcanization was carried out two times for 30 minutes and for 40 minutes at 150° C. The properties of the resulting rubbers are shown in the lower portion of Table 3.

Table 3

| Composition | Sample No. | | |
|---|---|---|---|
| (Parts) | A - 1 | A - 2 | A - 3 |
| Ethyl acrylate | 80 | Same | Same |
| Butyl acrylate | 20 | " | " |
| Ethylidene norbornene | 6 | " | " |
| N,N-Dimethylaniline | 0.75 | " | " |
| Benzoyl peroxide | 0.75 | " | " |
| Polymer | 100 | " | " |
| HAF Carbon black | 40 | " | " |
| ZnO No. 3 | 5 | " | " |
| Stearic acid | 1 | " | " |
| S | 0.5 | 1.5 | 0.5 |
| TMTD | 3 | 2 | — |
| MBTS | 0.5 | — | 3 |
| DPG | — | 1 | 2 |
| EZ | — | — | — |
| H | — | — | — |
| CBS | — | — | — |
| MBT | — | — | — |
| Vulcanization Conditions | | | |
| Vulcanization Time (minute) | 30   40 | 30   40 | 30   40 |
| Vulcanizate Properties | | | |
| Hardness (JIS) | 70   70 | 68   68 | 68   70 |

Table 3-continued

| Composition | Sample No. | | | | | |
|---|---|---|---|---|---|---|
| (Parts) | A-1 | | A-2 | | A-3 | |
| $M_{100}$ kg/cm² | 21 | 18 | 20 | 18 | 17 | 16 |
| $M_{300}$ kg/cm² | 55 | 52 | 53 | 49 | 36 | 36 |
| $T_B$ kg/cm² | 84 | 83 | 81 | 76 | 67 | 66 |
| $E_B$ % | 550 | 570 | 600 | 575 | 700 | 700 |
| $ML_{1+4}$ (100° C) | 38 | | 38 | | 38 | |
| $MS_{1+t}$ (120° C) (minute) | above 60 minutes | | above 60 minutes | | above 60 minutes | |

| Composition | Sample No. | | | | | | | |
|---|---|---|---|---|---|---|---|---|
| | A-4 | | A-5 | | A-6 | | A-7 | |
| (Parts) | | | | | | | | |
| Ethyl acrylate | Same | | Same | | Same | | Same | |
| Butyl acrylate | " | | " | | " | | " | |
| Ethylidene norbornene | " | | " | | " | | " | |
| N,N-Dimethylaniline | " | | " | | " | | " | |
| Benzoyl peroxide | " | | " | | " | | " | |
| Polymer | " | | " | | " | | " | |
| HAF Carbon black | " | | " | | " | | " | |
| ZnO No. 3 | " | | " | | " | | " | |
| Stearic acid | " | | " | | " | | " | |
| S | 1.5 | | 2 | | 2 | | 0.5 | |
| TMTD | — | | — | | — | | — | |
| MBTS | — | | 1.0 | | — | | — | |
| DPG | 0.5 | | — | | — | | 0.5 | |
| EZ | 1.5 | | — | | 0.5 | | — | |
| H | — | | 0.5 | | — | | — | |
| CBS | — | | — | | — | | 1.5 | |
| MBT | — | | — | | 0.5 | | — | |
| Vulcanization Conditions | | | | | | | | |
| Vulcanization Time (minute) | 30 | 40 | 30 | 40 | 30 | 40 | 30 | 40 |
| Vulcanizate Properties | | | | | | | | |
| Hardness (JIS) | 68 | 68 | 66 | 66 | 68 | 70 | 68 | 68 |
| $M_{100}$ kg/cm² | 19 | 16 | 17 | 16 | 20 | 19 | 17 | 17 |
| $M_{300}$ kg/cm² | 56 | 51 | 45 | 42 | 56 | 54 | 41 | 42 |
| $T_B$ kg/cm² | 93 | 91 | 85 | 79 | 95 | 94 | 77 | 73 |
| $E_B$ % | 550 | 600 | 630 | 675 | 590 | 600 | 700 | 675 |
| $ML_{1+4}$ (100° C) | 38 | | 41 | | 40 | | 40 | |
| $MS_{1+t}$ (120° C) (minute) | 9 minutes | | above 60 minutes | | 14 minutes | | above 60 minutes | |

$ML_{1+4}$ (100° C): The Mooney value after 4 minutes on a torque meter of a material preheated for 1 minute at 100° C using a larger rotor (L) in the Mooney share viscosimeter.
$MS_{1+t}$ (120° C) (minute): The period of time from closing of a chamber, at which the reading on the torque meter increased 5 units from the minimum when measured using a smaller rotor (S) in the Mooney share viscosimeter.
TMTD: Tetramethyl thiuram disulfide.
MBTS: Dibenzothiazyl disulfide.
MBT: 2-Mercaptobenzothiazole.
EZ: Zinc diethyldithiocarbamate.
H: Hexamethylenetetramine.
CBS: N-cyclohexylbenzothiazyl-2-sulfenamide.
DPG: Diphenylguanidine.

EXAMPLE 2

The following composition was copolymerized using an emulsion polymerization process.

| | Parts |
|---|---|
| Ethyl acrylate | 80.0 |
| n-Butyl acrylate | 20.0 |
| Ethylidene norbornene | 6.0 |
| Distilled water | 200.0 |
| Sodium laurylsulfate | 4.0 |
| $NaH_2PO_4 \cdot 2H_2O$ | 0.5 |
| $FeSO_4 \cdot 7H_2O$ | 0.2 |
| $K_2S_2O_8$ | 0.1 |
| Distilled water | 15 |

As the radical initiator, the above described $K_2S_2O_8$—$FeSO_4$ as a redox system was used. $K_2S_2O_8$ dissolved in distilled water was added to the mixture of raw materials in a reactor so that 1/10 of the total amount was added each time at intervals of 20 minutes. The reaction temperature was held at 2°–7° C. After the addition, the mixture was stirred for 3 hours. The resulting latex was poured into 3–4 times by volume of a 0.5% aqueous solution of $CaCl_2$ for salting out the latex. The precipitate was washed with water and dried at 55° C under reduced pressure. The yield was 97–99%. Then the composition shown in Table 4 was prepared using the polymer resulting from the above described reaction and the composition was vulcanized in order to improve the heat resistance.

Table 4

| | Parts |
|---|---|
| Polymer | 100 |
| HAF Carbon black | 40 |
| Zinc oxide | 5 |
| Stearic acid | 1 |
| Brominated dimethylol phenol resin | 10 |

A blend having the above composition was vulcanized for 20 minutes at 153° C using a hot press. The properties of the resulting vulcanized rubber are shown in Table 5.

Table 5

| | |
|---|---|
| Hardness (JIS) (°) | 65 |
| Tensile strength at Break (kg/cm²) | 103 |
| Elongation at Break (%) | 300 |

For the purpose of comparing the properties of the acrylic rubber of this example with those of a known acrylic rubber, the composition shown in Table 6 was prepared using a copolymer of 95% by weight of ethyl acrylate and 5% by weight of 2-chloroethyl vinyl ether, and the composition was then vulcanized.

Table 6

| | Parts |
|---|---|
| Polymer | 100 |
| HAF Carbon black | 40 |
| Stearic acid | 1 |
| Dibenzothiazyl disulfide | 2 |
| Triethylenetetramine | 1.5 |

In Table 6, dibenzothiazyl disulfide and triethylenetetramine were vulcanizing agents. The vulcanization was carried out under the following two conditions and the properties of the resulting vulcanized rubbers were measured. The results obtained are shown in Table 7.

Table 7

| | Vulcanization Conditions | |
|---|---|---|
| | 153° C × 45 minutes | 153° C × 230 minutes Post-vulcanization: 148° C × 24 hours |
| Hardness (JIS) (°) | 54 | 64 |
| Tensile strength at Break (kg/cm²) | 67 | 127 |
| Elongation at Break (%) | 1067 | 300 |

A rheometer cure curve of the polymer of the present invention and that of the polymer as the comparison sample are shown in FIG. 1. The measurement of the rheometer cure curves was carried out at 153° C.

It can be understood from the results in Table 7 that the known acrylic rubber requires a long vulcanization time of 230 minutes and a very long post-cure for an additional 24 hours in order to obtain the desired properties, while the copolymer of the present invention produces products having good properties as shown in Tables 2 and 4 in a very short vulcanization for 20 minutes. This fact is supported by FIG. 1 wherein the rheometer cure curve 1. of the polymer of this invention has a rapidly rising range as compared with the curve 2. of the comparison sample, and thus flat vulcanization can be carried out in the present invention.

EXAMPLE 3

100 Parts of the monomers in Experiment Nos. (a) to (i) shown in the upper portion of Table 8, the redox type radical initiator, N,N-dimethylaniline-benzoyl peroxide, styrene or methyl methacrylate as the third component for improving the properties shown in (j) and (k), 1.4 parts of a 7% aqueous solution of polyvinyl alcohol, 0.003 parts of sodium dodecylbenzene sulfonate and 400 parts of distilled water were charged in a 3-neck flask. After suspension by stirring, benzoyl peroxide dissolved in 10 times by weight of benzene was added dropwise thereto using a dropping funnel over a 30 minute period to cause polymerization at 2° to 5° C in a nitrogen atmosphere.

After 3 to 4 hours from the completion of the addition of the benzoyl peroxide, generation of heat became most violent. The stirring was continued for an additional 4 hours to end the polymerization reaction. The resulting copolymer light brown particles having a diameter of 0.2 to 1 mm were washed with water and dried at 55° C under a reduced pressure. The resulting copolymer was compounded with a sulfur type vulcanization agents and other additives shown in the middle portion of Table 8 using open rolls. The resulting compounding was vulcanized at for 45 minutes at 153° C using a press under a pressure of 15 kg/cm². The properties of the vulcanized products were measured using common methods. The results obtained are shown in the lower portion of Table 8.

Table 8

| Composition | (153° C × 45 minutes No post-vulcanization) Sample No. | | | | |
|---|---|---|---|---|---|
| | a | b | c | d | e |
| (Parts) | | | | | |
| Ethyl acrylate | 80 | 80 | 80 | 100 | 60 |
| Butyl acrylate | 20 | 20 | 20 | — | 40 |
| Vinyl norbornene | 6 | 6 | 6 | 6 | 6 |
| N,N-Dimethylaniline | 0.75 | 1.0 | 1.5 | 1.0 | 1.0 |
| Benzoyl peroxide | 0.75 | 1.0 | 1.5 | 1.0 | 1.0 |
| Styrene | — | — | — | — | — |
| Methyl methacrylate | — | — | — | — | — |
| Yield | 64 | 87 | 91 | 91 | 86 |
| Polymer | 100 | 100 | 100 | 100 | 100 |
| HAF Carbon black | 40 | 40 | 40 | 40 | 40 |
| Zinc oxide No. 3 | 5 | 5 | 5 | 5 | 5 |
| Stearic acid | 1 | 1 | 1 | 1 | 1 |
| Dibenzothiazyl disulfide | 0.5 | 0.5 | 0.5 | 0.5 | 0.5 |
| Sulfur | 1 | 0.5 | 0.5 | 0.5 | 0.5 |
| Tetramethylthiuram disulfide | — | 3 | — | 3 | 3 |
| Cadmium diethyldithio-carbamate | 4 | — | 4 | — | — |
| Vulcanizate Properties | | | | | |
| $ML_{1+4}$ (100° C) | 38 | 76 | 88 | — | 84 |
| $MS_{1+t}$ (120° C) (minute) | 34 | 61 | 36 | 57 | 73 |
| Scorch minimum value | 15 | 33 | 33.5 | 63 | 39 |
| Hardness (JIS) | 71 | 68 | 77 | 78 | 68 |
| Tensile Strength at Break (kg/cm²) | 102 | 73 | 76 | 92 | 70 |
| Elongation at Break (%) | 335 | 200 | 230 | 200 | 190 |

| Composition | (153° C × 45 minutes No post-vulcanization) Sample No. | | | | | |
|---|---|---|---|---|---|---|
| | f | g | h | i | j | k |
| (Parts) | | | | | | |
| Ethyl acrylate | — | 80 | 80 | 80 | 80 | 80 |
| Butyl acrylate | 100 | 20 | 20 | 20 | 20 | 20 |
| Vinyl norbornene | 6 | 4 | 8 | 10 | 6 | 6 |
| N,N-Dimethylaniline | 1.25 | 1.0 | 1.25 | 1.25 | 1.0 | 1.0 |
| Benzoyl peroxide | 1.25 | 1.0 | 1.25 | 1.25 | 1.0 | 1.0 |
| Styrene | — | — | — | — | 20 | — |
| Methyl methacrylate | — | — | — | — | — | 20 |
| Yield | 82 | 91 | 89 | 88 | 93 | 95 |
| Polymer | 100 | 100 | 100 | 100 | 100 | 100 |
| HAF Carbon black | 40 | 40 | 40 | 40 | 40 | 40 |
| Zinc oxide 3 | 5 | 5 | 5 | 5 | 5 | 5 |
| Stearic acid | 1 | 1 | 1 | 1 | 1 | 1 |
| Dibenzothiazyl disulfide | 0.5 | 0.5 | 0.5 | 0.5 | 0.5 | 0.5 |
| Sulfur | 0.5 | 0.5 | 0.5 | 0.5 | 0.5 | 0.5 |
| Tetramethylthiuram disulfide | 3 | 3 | 3 | 3 | 3 | 3 |
| Vulcanizate Properties | | | | | | |
| $ML_{1+4}$ (100° C) | 82 | 109 | 112 | 122 | — | — |
| $MS_{1+t}$ (120° C) | above 77 | 69 | 51 | 55 | — | — |
| Scorch minimum value | 43 | 56 | 56 | 60 | — | — |
| Hardness (JIS) | 66 | 72 | 77 | 77 | 82 | 80 |
| Tensile Strength at Break (kg/cm²) | 68 | 76 | 83 | 76 | 110 | 103 |
| Elongation at Break (%) | 160 | 205 | 150 | 155 | 220 | 180 |

It can be understood that good properties can be obtained in the copolymers of the present invention in Table 8 by vulcanization for a period as short as 45 minutes, which is shorter than that of the comparison sample in Table 6 and Table 7 in Example 2.

It is also clear from the results in Table 8 that remarkably better properties than in (a) to (i) can be obtained in (j) and (k) which correspond to the composition 4 of the present invention wherein styrene or methyl methacrylate is added as a third component in order to improve water resistance, heat resistance and oil resistance. Accordingly, it is clear the third component gives a notable effect.

EXAMPLE 4

A rheometer cure curve at 153° C of the polymer of Experiment No. (a) in Example 3 and that of a polymer for comparison (ethyl acrylate 95% by weight and 2-chloroethyl vinyl ether 5% by weight) were determined. The results obtained are shown in FIG. 2.

Figure 2:
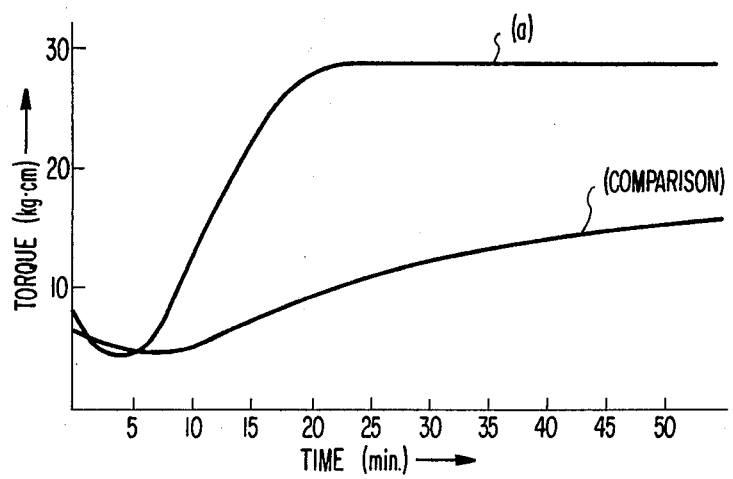

As is clear from FIG. 2, the rheometer cure curve of (a) of the present invention has a rapidly rising range as compared with the curve of the comparison sample, which means stable vulcanization can be carried out.

EXAMPLE 5

A copolymer was prepared by copolymerization of the composition shown in Table 9 using an emulsion polymerization process. Using the resulting copolymer, a blend shown in Table 10 was produced as in Example 3 and the properties thereof were measured.

Table 9

| | | Parts |
|---|---|---|
| { | Ethyl acrylate | 80 |
| | Butyl acrylate | 20 |
| | Vinyl norbornene | 6 |
| { | Distilled water | 200 |
| | Sodium lauryl sulfate | 4.0 |
| { | $NaH_2PO_4 \cdot 2H_2O$ | 0.5 |
| | $FeSO_4 \cdot 7H_2O$ | 0.2 |
| { | $K_2S_2O_8$ | 0.1 |
| { | Distilled water | 15 |

As the radical initiator, the above described $K_2S_2O_8$—$FeSO_4$ as a redox system was used. The emulsion polymerization was carried out at 2° to 7° C in a nitrogen atmosphere. $K_2S_2O_8$ dissolved in distilled water was added so that 1/10 of the total amount was added each time at intervals of 20 minutes. After the end of the addition, the composition was stirred for 3 hours. The resulting latex was poured into 3 to 4 times by volume of a 0.5% aqueous solution of CaCl$_2$ to salt out the latex. Then the precipitate was washed with water and dried at 55° C in a reduced pressure. The yield was 98%. The resulting polymer was vulcanized as the composition shown in Table 10.

Table 10

|  | Parts |
| --- | --- |
| Polymer | 100 |
| HAF Carbon black | 40 |
| Zinc oxide No. 3 | 5 |
| Stearic acid | 1 |
| Dibezothiazyl disulfide | 0.5 |
| Sulfur | 0.5 |
| Tetramethyl thiuram disulfide | 3 |

The above described mixture was vulcanized for 45 minutes at 153° C using a hot press. The properties of the resulting vulcanized rubber are shown in Table 11.

Table 11

| Hardness (JIS) (°) | 78 |
| --- | --- |
| Tensile Strength at Break (kg/cm$^2$) | 115 |
| Elongation at Break (%) | 200 |

As is clear from the each example described above, the acrylic rubber copolymers of the present invention form vulcanized rubbers having good properties by vulcanization in a much shorter period of time than in known acrylic rubbers. Further, the copolymers have low thickness to rolls and have a good processing properties. Moreover, the vulcanizates are excellent in weather-resistance, ozone resistance, gas-impermeability, heat resistance and oil resistance.

While the invention has been described in detail and with reference to specific embodiments thereof, it will be apparent to one skilled in the art that various changes and modifications can be made therein without departing from the spirit and scope thereof.

What is claimed is:

1. An acrylic copolymer vulcanizate comprising an acrylic copolymer composition consisting essentially of the radical polymerization product of a monomer mixture consisting of about 85 to 99 parts by weight of an acrylic acid ester of an aliphatic alcohol having 1 to 8 carbon atoms or a mixture of said alcohols and about 1 to 15 parts by weight of ethylidene norbornene vulcanized with sulfur.

2. The acrylic copolymer vulcanizate as set forth in claim 1, wherein the aliphatic alcohol comprises a mixture of aliphatic alcohols having 1 to 8 carbon atoms.

3. The acrylic copolymer vulcanizate as set forth in claim 1, wherein the acrylic acid ester comprises a mixture of ethyl acrylate and n-butyl acrylate.

4. The acrylic copolymer vulcanizate as set forth in claim 1, wherein the acrylic acid ester is ethyl acrylate.

5. The acrylic copolymer vulcanizate as set forth in claim 1, wherein the acrylic acid ester is n-butyl acrylate.

6. The acrylic copolymer vulcanizate as set forth in claim 1, wherein the acrylic acid ester is octyl acrylate.

7. An acrylic copolymer vulcanizate comprising an acrylic copolymer composition consisting essentially of the radical polymerization product of a monomer mixture consisting of about 55 to about 99 parts by weight of an an acrylic acid ester of an aliphatic alcohol having 1 to 8 carbon atoms or a mixture of said alcohols, about 1 to 15 parts by weight of ethylidene norbornene and up to about 30 parts by weight of acrylonitrile vulcanized with sulfur.

8. The acrylic copolymer vulcanizate as set forth in claim 7, wherein the aliphatic alcohol comprises a mixture of aliphatic alcohols having 1 to 8 carbon atoms.

9. The acrylic copolymer vulcanizate as set forth in claim 7, wherein the acrylic acid ester comprises a mixture of ethyl acrylate and n-butyl acrylate.

10. The acrylic copolymer vulcanizate as set forth in claim 7, wherein the acrylic acid ester is ethyl acrylate.

11. The acrylic copolymer vulcanizate as set forth in claim 7, wherein the acrylic acid ester is n-butyl acrylate.

12. The acrylic copolymer vulcanizate as set forth in claim 7, wherein the acrylic acid ester is octyl acrylate.

* * * * *

UNITED STATES PATENT AND TRADEMARK OFFICE
CERTIFICATE OF CORRECTION

PATENT NO. : 4,028,316
DATED : June 7, 1977
INVENTOR(S) : Tadao MATSUO et al

It is certified that error appears in the above-identified patent and that said Letters Patent are hereby corrected as shown below:

IN THE HEADING:

The name of the Assignee should read:

-- Assignee: Mitsuboshi Belting Limited

Signed and Sealed this

Eleventh Day of October 1977

[SEAL]

Attest:

RUTH C. MASON
*Attesting Officer*

LUTRELLE F. PARKER
*Acting Commissioner of Patents and Trademarks*